United States Patent [19]

Bulls

[11] Patent Number: 4,724,468

[45] Date of Patent: Feb. 9, 1988

[54] METHOD OF TRANSFERRING IMAGES ONTO A FABRIC

[76] Inventor: Charlene Bulls, Bulls' Country, 22 South Archer, Spearman, Tex. 79081

[21] Appl. No.: 912,925

[22] Filed: Sep. 29, 1986

[51] Int. Cl.$^4$ .............................................. G03B 27/32

[52] U.S. Cl. ......................................... 355/77; 355/40; 355/133

[58] Field of Search ............... 355/14 FU, 3 FU, 133, 355/40, 77, 132, 84; 430/113, 114, 295; 219/216; 427/153; 112/262.1

[56] References Cited

U.S. PATENT DOCUMENTS

| | | | |
|---|---|---|---|
| 4,053,660 | 10/1977 | Hurwitz et al. | 427/153 |
| 4,362,764 | 12/1982 | Matkan et al. | 430/113 X |
| 4,395,964 | 8/1983 | Warren | 112/262.1 |

OTHER PUBLICATIONS

Erica Wilson, "Quilts of America", p. 157, 1979.

*Primary Examiner*—Richard A. Wintercorn
*Attorney, Agent, or Firm*—Banner, Birch, McKie & Beckett

[57] ABSTRACT

A method of creating appliques and other items is disclosed which utilizes a standard photocopying machine to print images onto various fabrics. When creating an applique or other item, a series of fabric pieces formed in accordance with a desired image or shape are sewn together to form a final article. One of the more difficult steps involves transferring images onto different fabrics. The present invention inputs the fabric into paper feed of a photocopying machine where an input image is copied onto the fabric in the same way as photocopiers normally copy input images onto paper.

9 Claims, 2 Drawing Figures

METHOD OF TRANSFERRING IMAGES ONTO A FABRIC

BACKGROUND OF THE INVENTION

The present invention relates to a method of transferring an image onto a fabric.

The art and craft of creating various items from fabrics, including appliques has been popular for hundreds of years. An applique is a decoration or ornament formed by cutting pieces of one or more materials and applying them to the surface of another. In this way, an unlimited variety of colorful scenes can be created from simple floral designs to complex scenes containing a multitude of characters. Many other crafts also utilize fabrics, such as fabric painting, monogramming, stenciling, embroidering, cross stitching, needle point, doll and toy making, and quilt and pillow patchwork. Of course, fabrics are also used for the production of clothing.

The most common method of creating an applique begins with the overall design of the scene to be created. The scene will be a composite of various shapes, most of which will be formed from different fabrics. Each of these shapes will be cut from a chosen fabric and sewn in place on a background material. The fabrics may be woven or non-woven and may consist of natural fibers such as cotton, wool and linen, and artificial fibers such as nylon, polyester or rayon, as well as blends and mixtures of such fibers.

One of the most difficult steps in the creation of the applique is the creation of an outline of the desired shape on the fabric to be cut. Frequently, an outline is simply drawin by hand on the fabric and then the fabric is cut around the outline to produce the needed fabric piece. This can be rather difficult, however, since the outlines can be quite complex. When creating a scene with many fabric pieces, it is also desirable that the pieces be formed with very specific dimensions since they must be sewn together to form the final scene.

When creating items other than appliques, the steps are basically the same, that being that each shape or piece must be cut and sewn in place. In creating these items, it is also desirable that the pieces be formed with very specific dimensions since they must be sewn together to form the final project. The tendency for the paper pattern to slip or move during the cutting process, thus ruining fabric and causing extra work or having the pieces not fit exactly is a disadvantage.

The most common method of creating designs for fabic painting, embroidering, and monogramming is to trace the design. Then using carbon or graphite paper, transfer the design to the fabric. This is very time consuming and rather messy as the carbon or graphite can rub off on the fabric. Another method of transferring designs to fabric for embroidery or monogramming is with iron-on transfers which tend to be hard to cover with thread and are difficult, even impossible, to remove after the project is finished.

A typical method of creating designs for cross stitch and needle point is to count the actual thread count in the background fabric and work the design by counting each thread to match a specific color area. This is very time consuming and it is very easy to make mistakes or get off center or out of line.

In order to avoid the aforementioned difficulties with drawing the shape outline by hand, tracing the outline or using iron-ons, several methods have been developed. One widely used method is disclosed in U.S. Pat. No. 4,395,964 to Warren, and involves copying the original pattern with a standard photocopying machine thus producing a paper copy and cutting each of the desired shapes from the photocopied pattern. Next, each of the paper shapes is joined to the appropriate fabric by straight pins or some other method and the fabric is cut along the edge of the paper to produce a fabric piece with approximately the same dimensions as the original shape. Although this method is an improvement over the hand drawing method, there are several disadvantages, including the tendency for the paper to slip or move during the cutting process, thus ruining the fabric and the extra work involved in producing the photocopy, cutting the paper, attaching the paper to the fabric and removing the paper from the fabric after cutting.

SUMMARY OF THE INVENTION

Accordingly, it is the principle object of this invention to provide an improved method for creating appliques and other craft items.

A further object of this invention is to provide an improved method for easily and efficiently transferring a patten onto a fabric.

According to the invention, an applique or other craft is created in the conventional manner with the exception of the step involving the creation of an outline of a desired shape on fabric to be cut. A paper drawing of the outline is obtained in a manner similar to that disclosed by the Warren patent and is placed on a conventional photocopying machine (i.e., any machine capable of transferring an image from paper or a similar medium onto a fabric) in a manner normally followed when copying the outline. The desired fabric is then fed into the copy machine and the machine will make a copy of the drawing on the fabric in the same way that the machine copies a drawing onto paper. To facilitate feeding the fabric into the copier, the fabric can be attached to a backing, such as a piece of paper by tape or other means which provides increased rigidity or stiffness to the fabric.

DETAILED DESCRIPTION OF THE PREFERRED EMBODIMENTS

An applique or other craft item is created in accordance with the present invention according to the following steps. An overall picture or design of the scene or item to be created is developed. The design is broken down into a plurality of shapes and a particular fabric is chosen to represent each shape. For example, when creating an applique, a green fabric may be chosen to represent a tree and a flesh tone fabric to represent the faces of people. The next step involves producing outlines of these shapes on the chosen fabric so that the fabric may be cut to form the desired shapes. This is the step that has traditionally been performed by tracing or other difficult and time consuming methods.

Figure 1:
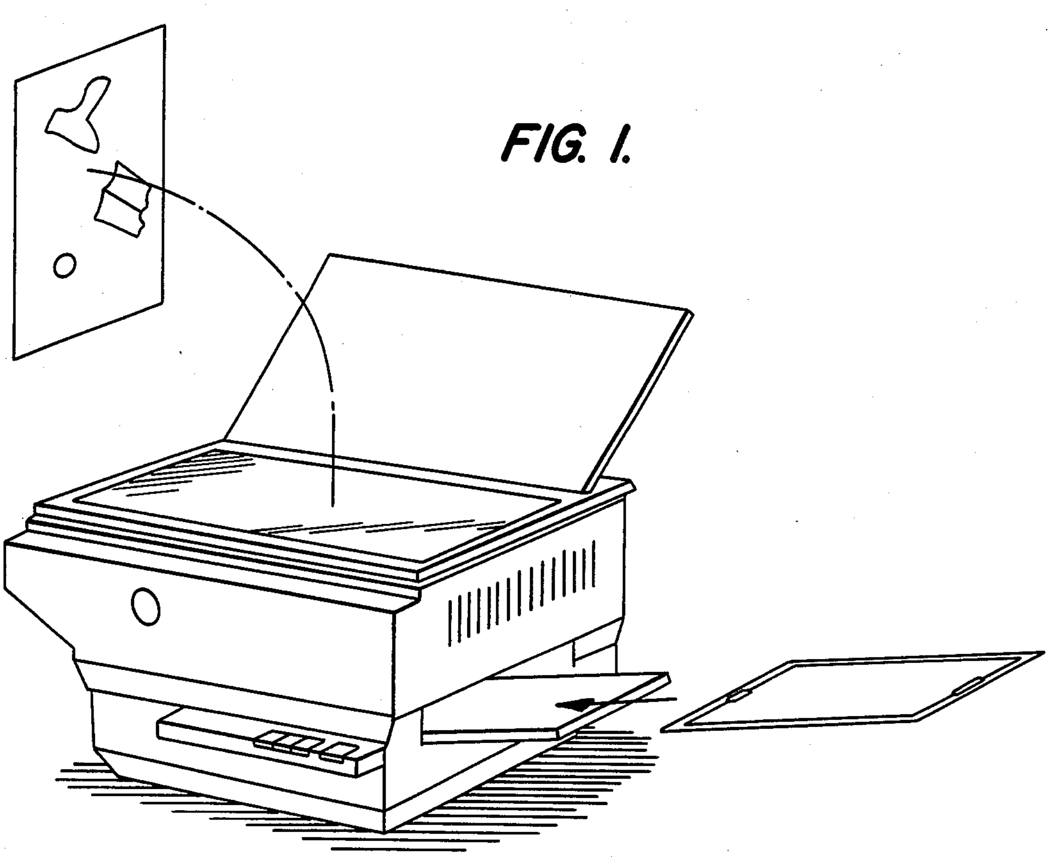
FIG. 1 shows a conventional photocopying machine being used in accordance with the present invention.
Figure 2:
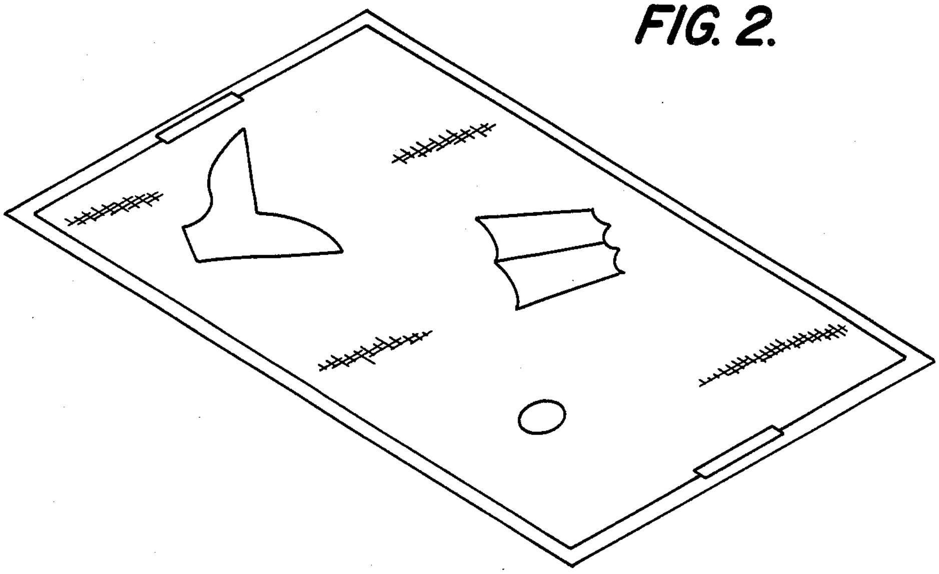
FIG. 2 shows a fabric that has had a pattern copied onto it in accordance with the invention.

The invention utilizes a standard photocopy machine to transfer an outline of the desired shapes onto the fabric to be cut. As shown in FIG. 1, paper drawing 10 containing one or more shapes 12 is placed on the copy surface or glass of standard photocopier 20. The chosen fabric 30, attached to paper backing 35, is fed into the photocopier machine where normally paper alone is fed. The photocopier 20 will copy images 12 onto fabric 30 producing the fabric shown in FIG. 2. Fabric 30 now has shapes 22 which are exact copies of shapes 12 on original drawing 10. Alternatively, several different fabrics could be attached to backing 35 and inserted for copying, so that one copy procedure can produce images on several different fabrics. It should also be understood that any photocopying machine can be used, including larger blueprint copiers so that various sizes of fabrics may be produced.

After images 12 have been dupicated onto fabric 30, the shapes can be conveniently cut out of fabric 30. The same steps are performed for all of the fabrics that will make up the final applique design or other item. Once all of the fabric cut-outs have been prepared, the item is completed in the traditional manner. When creating an applique, the fabric cut-outs are sewn onto a background fabric, over batting if desired. It is also found advantageous to use brown paper or butcher paper below the background fabric, such paper being torn away after sewing is completed. When making clothing, the pieces are sewn together in the traditional manner.

Fabric 30 will not be cut when it is inappropriate to do so. For example, when a needlepoint, painted fabric or other similar item is created, the design is transferred onto the fabric as discussed above and the fabric is then ready to paint, embroider, etc.

It may be desirable to use other means of inputting desired shapes into the photocopying machine other than placing a paper drawing on the glass photocopying surface. Since modern photocopying machines can create copies from electrical representations of images, it may be desirable to store images 12 in memory and read the data out of memory when needed. Modern computers and photocopy machines which are capable of storing images in memory and reading out the data in memory when needed are conventional and well known. This type of system would be useful where a large number of patterns are needed and where many sets of printed fabrics are to be created.

Through the use of a photocopying machine as described above, one of the most tedious and time consuming steps in creating applique or other craft designs has been greatly simplified. Fabrics can be preprinted and sold to consumers, thus greatly increasing consumer satisfaction and enjoyment.

The present invention has been described in connection with preferred embodiments. The preferred embodiments are used for illustrative purposes only and it will be understood by those skilled in the art that various modifications may be resorted to without departing from the spirit of the invention or the scope of the appended claims.

I claim:

1. A method of making appliques or other articles from pieces of fabric comprising the steps of:

transferring one or more images onto one or more fabrics;

cutting the fabrics in accordance with said images to form a plurality of fabric pieces;

joining the fabric pieces to form a final article; and wherein said step of transferring comprises inputting each of said images and fabrics into a photocopying machine such that the image is transferred directly onto said fabric.

2. The method according to claim 1 wherein said step of inputting said fabric comprises attaching said fabric to a backing before it is input into said photocopying machine.

3. The method according to claim 1 wherein said step of inputting comprises placing said image on the photocopying surface of the photocopying machine.

4. The method according to claim 1 wherein said step of inputting comprises transferring an electrical representation of said image to said phtotocopying machine.

5. The method according to claim 1 wherein said step of joining comprises sewing said fabric pieces onto a background fabric.

6. A method of transferring an image onto a fabric comprising the step of inputting said image and said fabric into a photocopying machine such that the image is transferred directly onto said fabric.

7. The method according to claim 6 wherein said step of inputting said fabric comprises attaching said fabric to a backing before it is input into said photocopying machine.

8. The method according to claim 6 wherein said step of inputting comprises placing said image on the photocopying surface of the photocopying machine.

9. The method according to claim 6 wherein said step of inputting comprises transferring an electrical representation of said image to said photocopying machine.

* * * * *